(12) United States Patent
Lukac et al.

(10) Patent No.: US 7,181,896 B2
(45) Date of Patent: Feb. 27, 2007

(54) MULTI-ROTOR FAN ASSEMBLY FOR A COTTON PICKER

(75) Inventors: J. Bradley Lukac, Chicago, IL (US); Scott W. TenBrink, Bettendorf, IA (US); Steven C. Shillington, Orion, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/435,585

(22) Filed: May 17, 2006

(65) Prior Publication Data

US 2006/0213169 A1 Sep. 28, 2006

Related U.S. Application Data

(62) Division of application No. 10/459,294, filed on Jun. 11, 2003.

(51) Int. Cl.
*A01D 46/08* (2006.01)
(52) U.S. Cl. .......................................................... 56/30
(58) Field of Classification Search .................... 56/30, 56/32, 28, 13.9, 31, 36
See application file for complete search history.

(56) References Cited

U.S. PATENT DOCUMENTS

| | | | |
|---|---|---|---|
| 1,187,545 A | 6/1916 | Olberg | |
| 2,689,439 A | 9/1954 | Martin | 56/12 |
| 2,702,976 A * | 3/1955 | Diserens | 56/13.2 |
| 2,719,394 A * | 10/1955 | Thomann et al. | 56/12.6 |
| 3,316,025 A * | 4/1967 | Sullivan et al. | 406/97 |
| 3,332,220 A | 7/1967 | Lofgreen | 56/30 |
| 3,401,510 A * | 9/1968 | Hubbard | 56/30 |
| 3,487,450 A * | 12/1969 | Hubbard | 406/42 |
| 3,612,711 A | 10/1971 | Meier | 415/97 |
| 4,914,896 A | 4/1990 | Gullickson | 56/12.9 |
| 4,974,401 A * | 12/1990 | Deutsch | 56/28 |
| 5,129,216 A | 7/1992 | Gullickson | 56/12.9 |
| 5,271,713 A * | 12/1993 | Sheldon, Jr. | 415/128 |
| 5,406,779 A * | 4/1995 | Deutsch et al. | 56/32 |
| 5,499,491 A * | 3/1996 | Deutsch et al. | 56/10.2 H |
| 5,637,039 A | 6/1997 | Chiu et al. | 454/200 |
| 5,730,651 A | 3/1998 | Chen et al. | 454/205 |
| 2006/0090440 A1* | 5/2006 | Gullickson | 56/13.9 |

* cited by examiner

*Primary Examiner*—Árpád Fábián Kovács
(74) *Attorney, Agent, or Firm*—Michael G. Harms; John William Stader; Stephen A. Bucchianeri

(57) ABSTRACT

A multi-rotor blower fan assembly for a cotton picker utilizes a plurality of separate fan enclosures each containing a fan for supplying an individual air flow to a picker unit of the picker, the fans being mounted on a common shaft for rotation therewith, with a unitary removable or openable cover or hood covering access openings of the fan enclosures. One or more of the fan assemblies can be mounted on the picker, for instance, on an existing platform on the picker chassis just rearward of the operator cab, in end-to-end relation, and rotatably driven using a common drive.

4 Claims, 5 Drawing Sheets

MULTI-ROTOR FAN ASSEMBLY FOR A COTTON PICKER

This divisional application claims priority under 35 U.S.C. § 120 from co-pending U.S. patent application Ser. No. 10/459,294 filed on Jun. 11, 2003 by J. Bradley Lukac et al. with the same title, the full disclosure of which is hereby incorporated by reference.

TECHNICAL FIELD

This invention relates generally to fans for generating individual air flows to cotton picker row units of cotton harvesting machines for conveying harvested cotton from the row units to a container, and more particularly, to a fan assembly utilizing multiple rotors having lower portions contained in individual lower fan housings for receiving and providing individualized air flows to the row units, and upper portions contained in or covered by a common upper housing section or hood, to provide easy access to the fans for inspection, maintenance and service.

BACKGROUND ART

Currently, self-propelled cotton picking machines typically include several picker row units or harvesting units which are driven by the machine through a cotton field for harvesting cotton from the cotton plants. Essentially, the cotton is removed from the plants by rotating spindles of the row units, and the cotton is removed from the individual spindles by devices known as doffers. After removal, the cotton is carried from the row units by continuous individual flows of air through ducts into a receiver or container such as a basket located on the cotton picker. The individual flows of air must be adequately strong to carry the cotton several feet upwardly to the basket and then blow the cotton into the basket.

Typically, the cotton picker includes at least one fan or blower for generating several of the individual air flows to the picker row units and from there to the receiver or container. For instance, cotton pickers currently made by Case LLC typically include two radial fans driven by belts connected to a rotating output of the engine for this purpose. The fans are mounted within the chassis of the machine in front of the engine, and each is typically connected to two or more picker row units. In turn, each row unit typically includes one or two picking apparatus. Thus, for a picker including four row units each having two sets of picking apparatus, eight individual air flows and ducts for delivering the air flows to the respective picking apparatus, and eight ducts for carrying the airborne picked cotton from the picking apparatus to the basket, are typically used. This arrangement has worked well for pickers including four or five row units. A disadvantage that has been anticipated, however, is that when additional row units are contemplated, for instance, six or more units including two sets of picking apparatus each, the currently used fans would have to be operated at speeds above those desired to provide the required air flows, which would be expected to result in lower reliability and shortened life of the fans and their drives. Also, due to the location of the fans within the chassis of the machine, they are more difficult than desirable to access for inspection, maintenance and service, such that, the lower reliability would result in longer downtimes for service. Still further, it is anticipated that using one fan to provide air flows to three or more picking apparatus could result in uneven or less than desirable air flow to one or more of the apparatus.

Thus, what is sought is a fan assembly for a cotton picking machine which overcomes many of the disadvantages and shortcomings set forth above.

SUMMARY OF THE INVENTION

According to the present invention, a multi-rotor blower fan assembly for a cotton picking machine including a plurality of picker row units or harvesting units, which overcomes many of the disadvantages and shortcomings set forth above, is disclosed. The present fan assembly utilizes a plurality of separate fan enclosures each containing a fan for supplying an individual air flow to a picker unit, the fans being mounted on a common shaft for rotation therewith, with a unitary removable or openable cover or hood extending along the shaft and covering individual access openings of the fan enclosures. The present fan assembly is preferably mounted on the picker at a convenient, easy to access location, such as on an existing platform on the picker chassis just rearward of the operator cab, and two or more of the fan assemblies can be arranged in end-to-end relation, so as to be rotatably driven using a common drive such as a mechanical drive such as a belt and/or shaft drive connected to the power plant of the picker, a motor such as a fluid motor or electric motor, as desired. When inspection, maintenance or service is required, the unitary cover or hood of the fan assembly is removed or opened, to allow accessing all of the fans of the assembly at the same time.

According to a preferred aspect of the invention, each fan assembly includes an elongate shaft supported for rotation about a longitudinal, preferably horizontal axis therethrough, and a plurality of rotary fans mounted on the shaft at spaced locations along the length thereof for rotation therewith, for providing the individual air flows to a desired number of picker units of the machine. Each fan assembly includes a plurality of individual fan housings supported about a portion of each of the fans, respectively. Each of the fan housings includes an interior space through which the fan can rotate with the shaft. Each of the fan housings additionally includes at least one axially facing air inlet opening connecting the interior space with spaces between adjacent ones of the fan housings, respectively, and a radially facing access opening connecting with the interior space. Each fan assembly includes a unitary hood or enclosure positionable in covering relation to the radially facing access openings of the fan housings for enclosing the fans while allowing the free rotation thereof through the interior spaces for generating flows of air, and the hood or enclosure being openable for allowing simultaneously accessing the fans through the access openings. The fan assembly further includes air outlet openings connecting to the interior spaces, respectively, for connecting to ducts extending to the picking or harvesting units for delivering the individual flows of air generated by the fans separately thereto.

As a result, each of the picker row units or harvesting units of the cotton harvester can receive an air flow or flows from a dedicated fan, thereby ensuring that the air flow to the individual row units is adequate, and, if the fans and ducts are the same and similarly connected to the row units, the air flows thereto should be about equal.

As a preferred embodiment for use on a cotton harvesting machine having six picker row units, two of the present fan assemblies are provided in horizontal axial alignment just behind the operator cab of the machine and are rotatably driven by a common power source such as, but not limited to, a belt, shaft or other mechanical drive connected to an output of an engine of the machine, a fluid motor, an electric motor or the like, and the hood or upper enclosure of each of the fan assemblies is easily reachable and openable for accessing the fans.

DETAILED DESCRIPTION OF THE INVENTION

Figure 1:
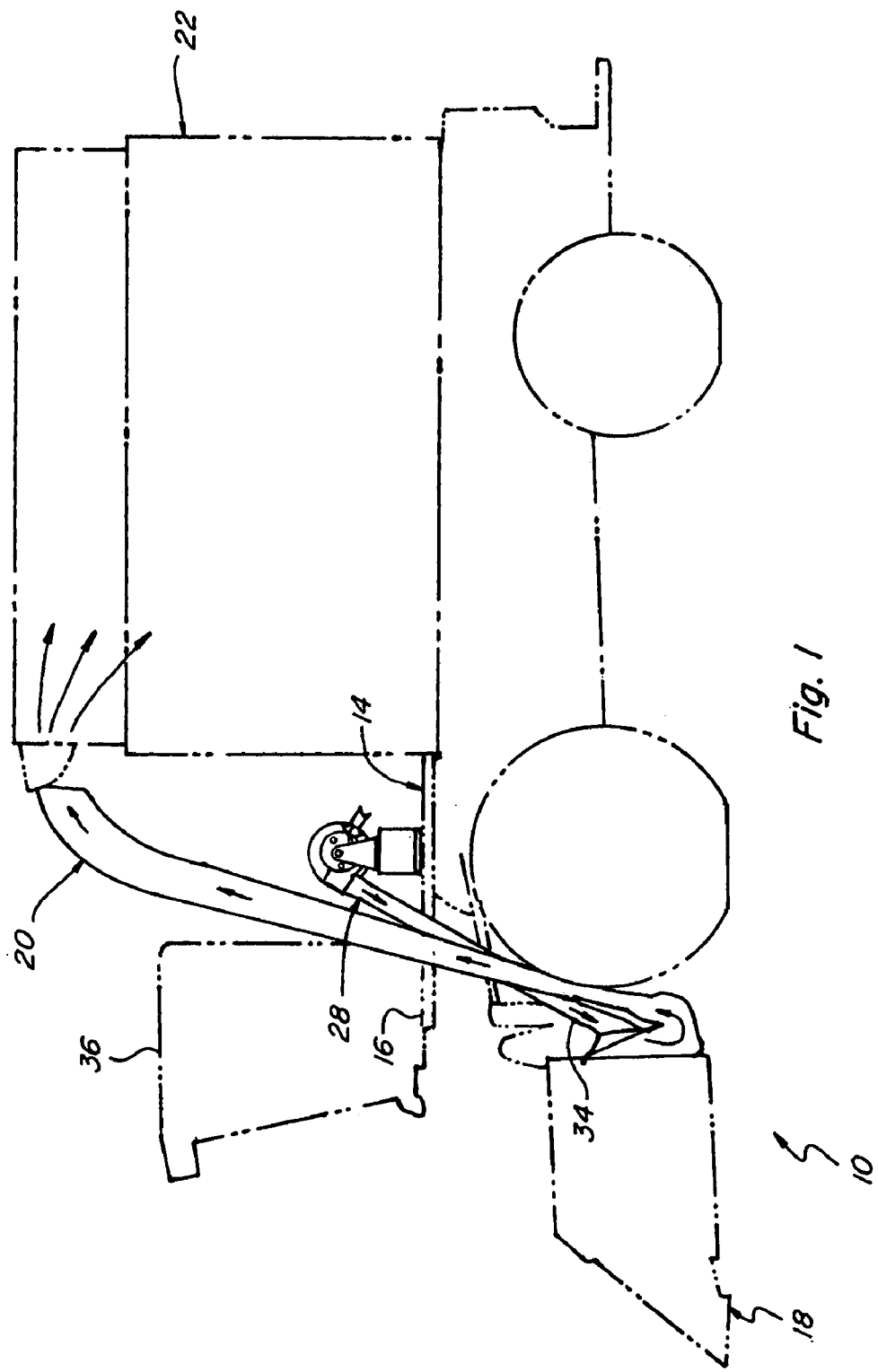
FIG. 1 is a simplified side elevational view of a self-propelled cotton picking machine including multi-rotor fan assemblies according to the invention.
Figure 1A:
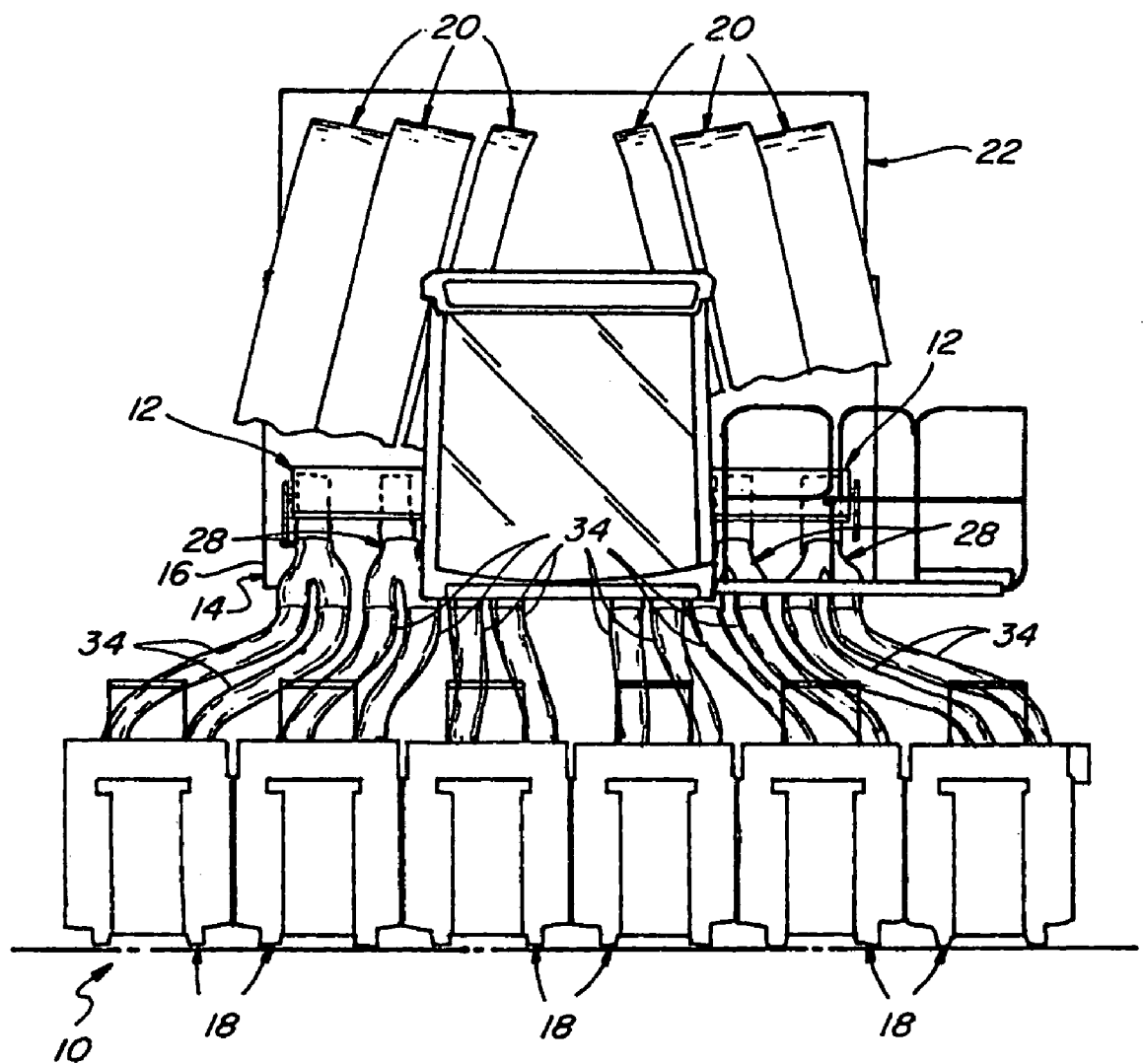
FIG. 1A is a simplified front view of the machine of FIG. 1.

Referring now to the drawings wherein a preferred embodiment of the present invention is shown, FIGS. 1 and 1A shows a representative self-propelled cotton picking machine 10 of well known, conventional construction, including a pair of multi-rotor blower assemblies 12 constructed and operable according to the teachings of the present invention. Cotton picker 10 generally includes a chassis 14 including a forward end 16 supporting a plurality of cotton harvesting units or picker row units 18 operable for removing cotton from cotton plants as row units 18 are moved forwardly therethrough by picker 10, also in the conventional, well known manner. Each picker row unit 18 generally includes a pair of rotors (not shown) for rotatably driving a plurality of picker spindles through the cotton plants for removing the cotton therefrom, the cotton being removed from the spindles by doffers (also not shown) such that the removed cotton can be carried by continuous flows of air through ducts 20 extending from units 18 upwardly and rearwardly to a cotton receiving basket 22 on picker 10. Here, the row units 18 depicted are each of the conventional type including two picking apparatus each including a pair of rotors and doffers, although it should be understood that units 18 could likewise include only a single rotor and doffer pair, as desired. Here it should also be noted that machine 10 is depicted including six picker row units 18, for a total of twelve rotor and doffer pairs, however, machine 10 could alternatively include any desired number of units 18 including one or more pairs of rotors and doffers or other picking apparatus, as desired.

Figure 2:
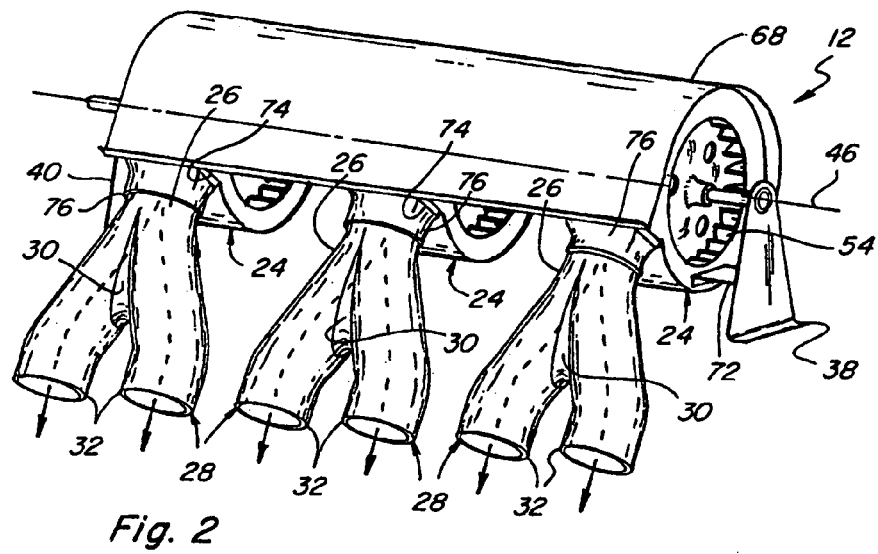
FIG. 2 is a front and side perspective view of one of the fan assemblies of FIG. 1.

Referring also to FIG. 2, which shows one of the fan assemblies 12, each fan assembly 12 is operable for providing individual flows of air to three of the six row units 18 of harvester 10 of FIGS. 1 and 1A. Each fan assembly 12 preferably includes three rotary fan units 24. Each fan unit 24 connects to an inlet end 26 of an air outlet duct 28 including a plenum 30 that splits into two outlet ends 32. Each outlet end 32 is, in turn, connected to an individual duct 34 (FIGS. 1 and 1A) extending to the picking apparatus of one of the row units 18. Thus, in operation, each fan unit 24 will generate a flow of air (denoted by thin black arrows) that is directed into inlet end 26 of an air outlet duct 28, which, in turn, splits the air flow at plenum 30 so as to be substantially evenly directed through outlet ends 32 into ducts 34, which carry the air flows to the respective picking apparatus of individual row units 18. The air flows are directed through the respective units 18 for receiving the picked cotton from the doffers, and then carry the picked cotton upwardly and rearwardly through ducts 20 so as to deposit the picked cotton in basket 22 wherein the air flows are dissipated into atmosphere. Here, in reference to FIG. 1, it should be noted that fan assemblies 12 are located on an open platform area of chassis 14 just behind a forwardly located operator cab 36 to facilitate accessing fan assemblies 12 for inspection, maintenance and service. This location also minimizes connections and bends and the like in ducts 34 that can reduce the air flow quality. The location of fan assemblies 12 also allows the portions of ducts 34 in the vicinity thereof to be relatively exposed so as to be more easily inspected for damage, leaks and the like.

Figure 3:
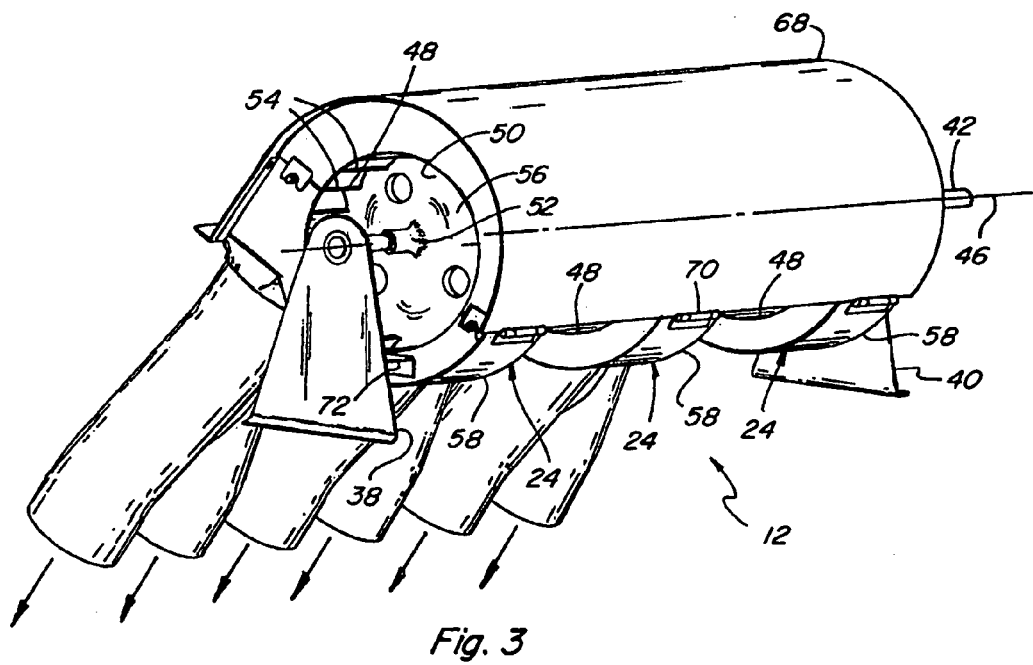
FIG. 3 is a rear and side perspective view of the fan assembly of FIG. 2.

Referring also to FIG. 3, each fan assembly 12 includes a pair of spaced supports 38 and 40 which are each preferably of a sheet metal, plastics or other suitable lightweight and sturdy construction and which are bolted or otherwise easily removably mounted to chassis 14 so as to extend upwardly therefrom. Each fan assembly 12 includes an elongate shaft 42, which here is oriented horizontally, supported between supports 38 and 40 on bushings or bearings 44 for rotation of about a horizontal axis 46 extending longitudinally through shaft 42. Shaft 42, in turn, supports three rotary fans 48 of fan units 24, respectively, for rotation therewith at axially spaced locations along a predetermined portion of the length thereof. Fans 48 are held to shaft 42 using keys, splines, set screws, adhesives, press fits, or the like (not shown) in the well known, conventional manner. Here, it should be noted that although shaft 42 of each fan assembly 12 is shown supporting three fans 48, alternatively, other numbers of fans, such as, but not limited to, two fans, could be used as desired or required for a particular application. Thus, as an example, for a cotton picking machine 10 having five picker row units, one of the fan assemblies may have only two fan units 24 and the other three, or, as another alternative, the machine may have two fan units 24, one of which may include only two fans 48 and the other three.

Figure 4:
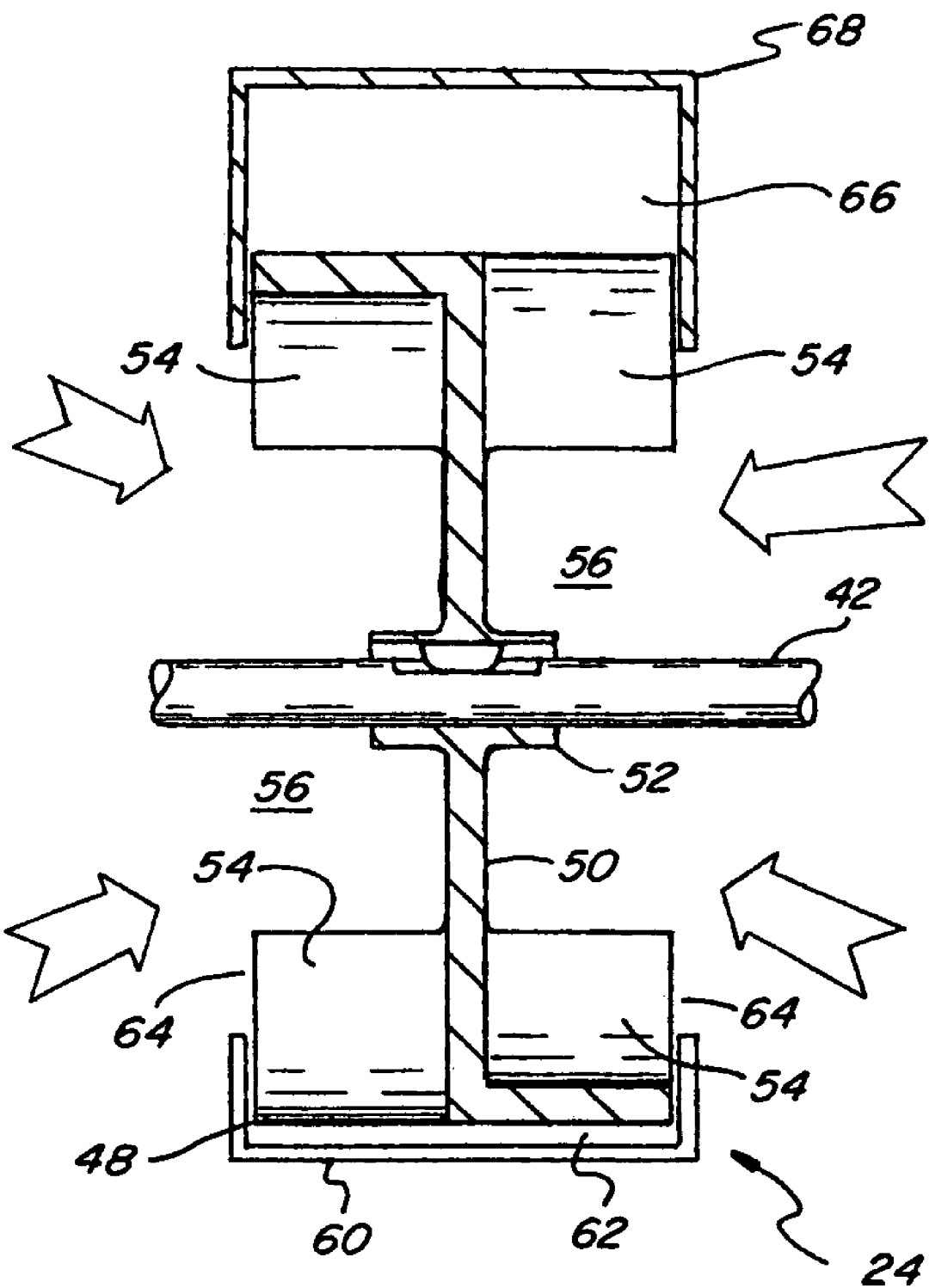
FIG. 4 is a representative fragmentary sectional view of a fan assembly.

Referring also to FIG. 4, each fan 48 is preferably a conventional well known rotary fan such as, but not limited to, a centrifugal or radial fan of conventional construction and operation, for instance, a two sided centrifugal fan shown including a molded or otherwise manufactured metal or plastics disk 50 supported concentrically around shaft 42 by a hub 52, disk 50 supporting a plurality of blades 54 adjacent opposite axial sides thereof oriented at a desired pitch angle at spaced locations around disk 50, and with disk 50, defining radial inner areas 56 on opposite axial sides of disk 50.

Fan 48 of each fan unit 24 is contained in an individual enclosure or fan housing 58 of sheet metal, plastics or other suitable sturdy construction. Each fan housing 58 includes a lower fan enclosure 60 that extends around about the lower one-half portion of each fan 48 in radially outwardly spaced relation thereto so as to enclose and define about a lower one-half of a radial outer area 64 extending around the fan 48. Lower fan enclosure 60 also extends around the axial ends of the fan 48 between radial inner areas 56 and radial outer area 64 and defines at least one axially facing air inlet opening 64 connecting with a radial inner area 56, for induction of air to fan 48, as shown by the large arrows in FIG. 4. As a result of the construction of lower fan enclosure 60, an upwardly and radially outwardly facing access opening 66 is defined, through which one can look and/or reach into radial outer area 62 for inspecting, maintaining or servicing fan 48.

Each fan assembly 12 includes a removable and/or openable unitary covering hood or cover, such as a preferred upper fan enclosure 68 that extends axially over all of the fan units 24 of the fan assembly 12, so as to enclose and cover access openings 66 of the fan units, as best shown in FIGS. 2 and 3. Each upper fan enclosure 68 is preferably a semi-cylindrical shape unitary member that extends over at least the predetermined length of shaft 42 including the two or three fan units 24, so as to also cover the spaces between fan units 24. Covering the spaces between fan units 24 can be viewed as an additional advantage, as it can reduce or limit the amount of airborne cotton filaments and dust and other particulates falling or otherwise present in the vicinity of air inlet openings 64, such that air flow toward the fans is in a generally upward direction, so as to reduce or limit induction of the filaments and particulates through openings 64 into fans 48. This configuration also reduces or eliminates need for additional shielding. Also referring to FIG. 5, upper fan enclosure 68 is preferably hingedly connected by hinges 70 to each lower fan enclosure 60 so as to be openable to allow viewing, maintaining and servicing fans 48 therein through access openings 66. Suitable sealing elements of a material such as a felt, rubber or rubbery plastics (not shown) can be disposed between mating portions of upper fan enclosure 68 and lower fan enclosures 60, as desired or required, to provide desired air flow barriers. Also, it can be noted that because each fan 48 inducts air separately, as compared to jointly through a common inlet, suction is correspondingly lower at inlet openings 64, such that there is preferably a further reduced induction of airborne matter into openings 64. Here, it should be noted that the axially facing ends of lower fan enclosures are of a two piece or split construction clamped, fastened or otherwise suitably held together, and that, alternatively, the upper portions of the ends could be connected to the upper fan enclosure, such as in a clamshell configuration, as desired.

Referring again to FIGS. 2 and 3, the endmost lower fan enclosures 60 are preferably fixedly connected to supports 38 and 40 by suitable bracket members 72 of sheet metal, plastics or other suitable construction, such that upper fan enclosure 68 via middle hinge 70 will effectively support the middle lower fan enclosure 60. Here, it should be understood that other manners of support can be utilized for supporting lower fan enclosures 60, such as additional sheet metal or plastics members, as desired.

Figure 5:
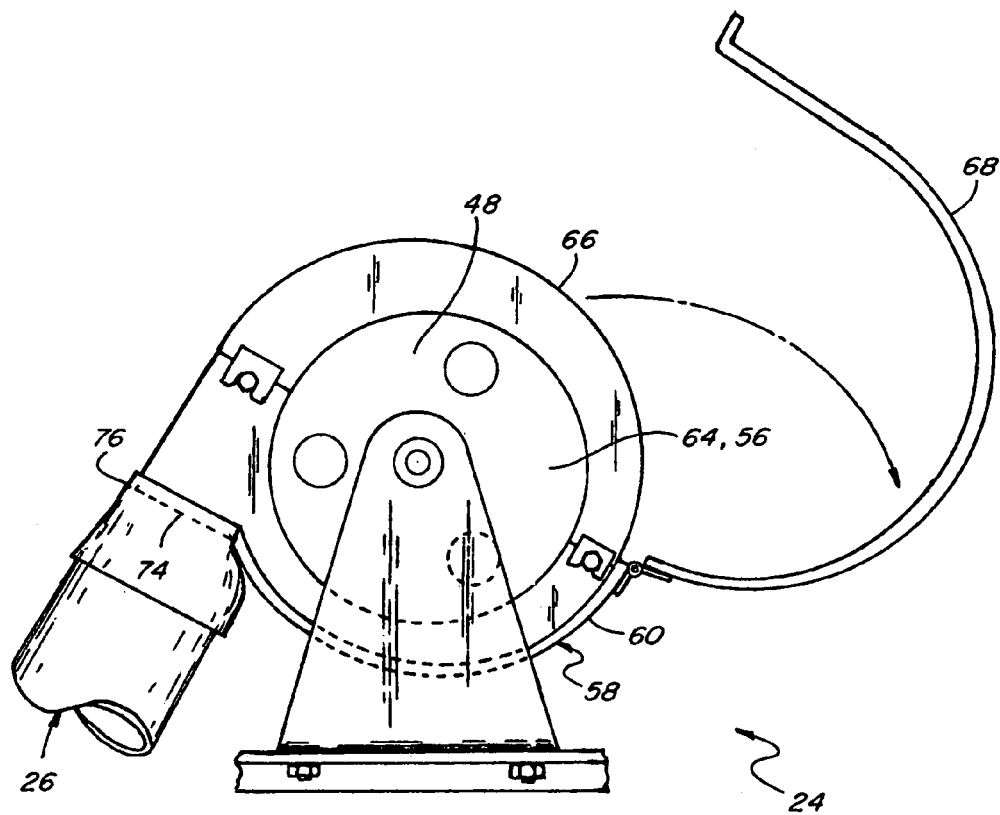
FIG. 5 is a side view of the one of the fan assemblies with an upper fan enclosure thereof shown in an open position.

Additionally, referring to FIGS. 2 and 5, each fan housing 58 of each fan unit 24 includes a radially outwardly directed air outlet opening 74 (shown covered by adapter fittings 76) connecting radial outer area 62 of unit 24 to inlet end 26 of air outlet duct 28, for directing a flow of air generated by each fan 48 into duct 28. Here, it should be noted that air outlet openings 74 are shown at their preferred locations on lower fan enclosure 60, and in a preferred downwardly extending orientation, but could alternatively be located in upper fan enclosure 68, as desired.

Figure 6:
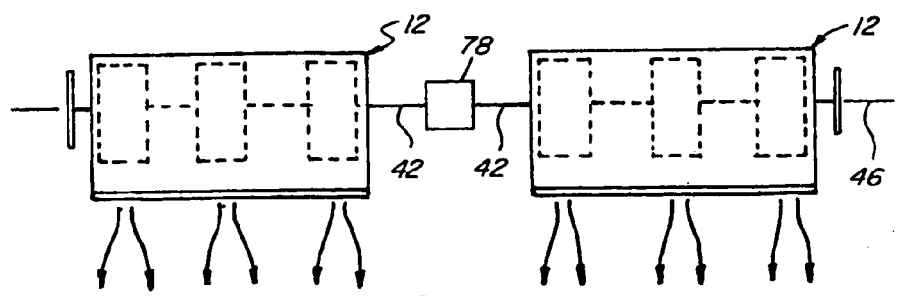
FIG. 6 is a simplified schematic top view of the fan assemblies connected to a joint drive for rotating the fans thereof.

In FIG. 6, fan assemblies 12 are shown from above with shafts 42 thereof axially aligned along axis 46 or otherwise suitably related so as to be connected to a suitable rotational drive 78, which can be, for instance, a mechanical drive such as a belt and/or shaft arrangement connected to a power plant of machine 10, or a fluid or electric motor.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A blower fan assembly for a cotton harvesting machine, for directing individual flows of air to harvesting units of the machine, the blower fan assembly comprising:

an elongate shaft supported for rotation about a generally horizontal longitudinal axis therethrough;

a plurality of fans mounted on the shaft for rotation therewith at spaced locations within a predetermined portion of the length of the shaft, each of the fans including a radial inner portion defining a radial inner area adjacent to the shaft and a radial outer portion spaced radially outwardly of the radial inner portion and facing radially outwardly away from the shaft;

a plurality of individual blower fan enclosures disposed at the spaced locations and defining enclosed spaces containing lower portions of the radial outer portions of the fans, respectively;

a single upper fan enclosure extending over at least the predetermined portion of the length of the shaft and defining enclosed spaces containing upper portions of the radial outer portions of the fans connecting with the spaces containing the lower portions thereof, respectively, the enclosures being sufficiently spaced from the fans and being supported so as to allow free rotation of the fans with the shaft; and wherein at least one of the lower fan enclosure and a portion of the upper fan enclosure containing each of the fans include an axially facing air inlet opening beneath the upper fan enclosure and connecting to the radial inner area for the passage of air thereto, and wherein at least one of the lower fan enclosure and the upper fan enclosure containing each of the fans include individual air outlet passages connecting to the spaces around the radial outer portions of the fan for connection to ducts extending to the harvesting units, respectively, for the passage of individual flows of air from the fans to the ducts.

2. The fan assembly of claim 1, wherein the upper fan enclosure provides a cover over the air inlet openings and extends downwardly thereover sufficiently such that air being inducted into the inlet openings will flow in a generally upward direction thereto.

3. The fan assembly of claim 1, wherein the upper fan enclosure is hingedly connected to at least some of the lower fan enclosures so as to be openable for allowing access to the fans and the spaces containing the upper portions of the radial outer portions of the radial outer portions of the fans.

4. The fan assembly of claim 3, wherein the upper fan enclosure supports at least one of the lower fan enclosures.

* * * * *